United States Patent [19]
Lau et al.

[11] Patent Number: 4,811,556
[45] Date of Patent: Mar. 14, 1989

[54] MULTIPLE-PROPELLANT AIR VEHICLE AND PROPULSION SYSTEM

[75] Inventors: Monica M. Lau, Okeana; George A. Coffinberry, West Chester, both of Ohio

[73] Assignee: General Electric Company, Cincinnati, Ohio

[21] Appl. No.: 918,215

[22] Filed: Oct. 14, 1986

[51] Int. Cl.$^4$ .............................................. C06D 5/00
[52] U.S. Cl. ........................................ 60/206; 60/212; 60/219; 60/260
[58] Field of Search ................... 60/206, 212, 219, 260

[56] References Cited

U.S. PATENT DOCUMENTS

| | | | |
|---|---|---|---|
| 2,655,786 | 10/1953 | Carr | 60/207 |
| 2,902,822 | 9/1959 | McKiernan | 244/172 |
| 2,940,253 | 6/1960 | Carr | 60/39.465 |
| 2,952,969 | 9/1960 | Wasserbach et al. | 60/205 X |
| 2,974,475 | 3/1961 | Kolfenbach et al. | 60/260 |
| 3,103,885 | 9/1963 | McLauchlan | 60/260 |
| 3,119,238 | 1/1964 | Chamberlain et al. | 220/426 |
| 3,164,955 | 1/1965 | Garraway | 60/206 |
| 3,170,281 | 2/1965 | Glassman | 60/207 |
| 3,173,247 | 3/1965 | Smith et al. | 60/206 |
| 3,177,656 | 4/1965 | Tick et al. | 60/206 |
| 3,202,381 | 8/1965 | Wuenscher | 244/172 |
| 3,242,811 | 3/1966 | Swet | 244/172 |
| 3,263,414 | 8/1966 | Herbst | 60/206 |
| 3,372,546 | 3/1968 | Arnold et al. | 60/206 |
| 3,377,801 | 4/1968 | Altman | 60/259 |
| 3,392,864 | 7/1968 | Perkins, Jr. | 220/901 |
| 3,511,054 | 5/1970 | Swithenbank et al. | 60/220 |
| 3,525,223 | 8/1970 | Radebold et al. | 60/206 |
| 3,811,280 | 5/1974 | Wharton et al. | 60/207 |
| 3,871,179 | 3/1975 | Bland | 60/526 |
| 3,900,668 | 8/1975 | Olcott | 428/408 X |
| 3,900,675 | 8/1975 | Olcott | 428/373 X |
| 3,924,034 | 12/1975 | Olcott | 428/402 X |
| 3,925,133 | 12/1975 | Olcott | 428/294 X |
| 3,945,203 | 3/1976 | Kayser | 60/259 |
| 3,955,784 | 5/1976 | Salkeld | 60/245 |
| 3,966,855 | 6/1976 | Hollenberg et al. | 264/65 |
| 3,979,005 | 9/1976 | Robinson et al. | 244/135 R |
| 3,991,248 | 11/1976 | Bauer | 428/408 X |
| 4,029,844 | 6/1977 | Olcott | 427/219 X |
| 4,070,993 | 1/1978 | Chen | 123/3 |
| 4,105,819 | 8/1978 | Kotcharian | 220/901 |
| 4,193,828 | 3/1980 | Moores et al. | 428/408 X |
| 4,397,901 | 8/1983 | Warren | 428/408 X |
| 4,599,256 | 7/1986 | Vasilos | 428/408 X |

FOREIGN PATENT DOCUMENTS

| | | | |
|---|---|---|---|
| 1108090 | 1/1956 | France | 60/260 |
| 459924 | 1/1937 | United Kingdom . | |
| 727720 | 4/1955 | United Kingdom . | |
| 793300 | 4/1958 | United Kingdom . | |
| 800354 | 8/1958 | United Kingdom . | |
| 840914 | 7/1960 | United Kingdom . | |
| 847084 | 9/1960 | United Kingdom . | |
| 1046909 | 10/1966 | United Kingdom . | |
| 1089055 | 11/1967 | United Kingdom . | |
| 1242231 | 8/1971 | United Kingdom | 60/259 |

OTHER PUBLICATIONS

Wright's Turbo Cyclone 18, Aero Digest, Aug. 1948.
Healy, "Rocket Engine Developments", Aero Digest, Nov. 1947, pp. 38-41, 116, 119-120 (60/260).

Primary Examiner—Peter A. Nelson
Attorney, Agent, or Firm—Derek P. Lawrence

[57] ABSTRACT

A propulsion system which utilizes hydrocarbon and hydrogen fuel, having means for cooling of the combustor liner and throat liner of a rocket casing by endothermic pyrolysis of the hydrocarbon in the presence of hydrogen in the fuel passageway. The hydrogen in the fuel accelerates the rate of endothermic pyrolysis in the fuel passageway which is adjacent to and surrounds the combustor liner and the throat liner. Means is also provided for high heat flux to the combustor liner and throat liner from combustion within the rocket casing so that the temperature of the liners exceeds their thermal limits. By the propulsion system and method, hydrocarbon fuel and hydrogen are passed through the fuel passageway which is adjacent to and surrounds the combustor liner and the throat liner in a rocket casing, and heat from the combustion of fuel and hydrogen in the combustion chamber is provided to the fuel passageway by radiation through the combustor liner and the throat liner. The hydrocarbon fuel is heated in the presence of the hydrogen at a temperature sufficient to cause the endothermic pyrolysis of the hydrocarbon in the fuel passageway, and the heat removed from the combustion through the combustor liner and throat liner reduces the temperature in the combustion chamber at the combustor liner and the throat liner so the thermal limits of the combustor liner and throat liner are not exceeded while the hydrogen in the fuel accelerates the rate of pyrolysis of the hydrocarbon.

23 Claims, 2 Drawing Sheets

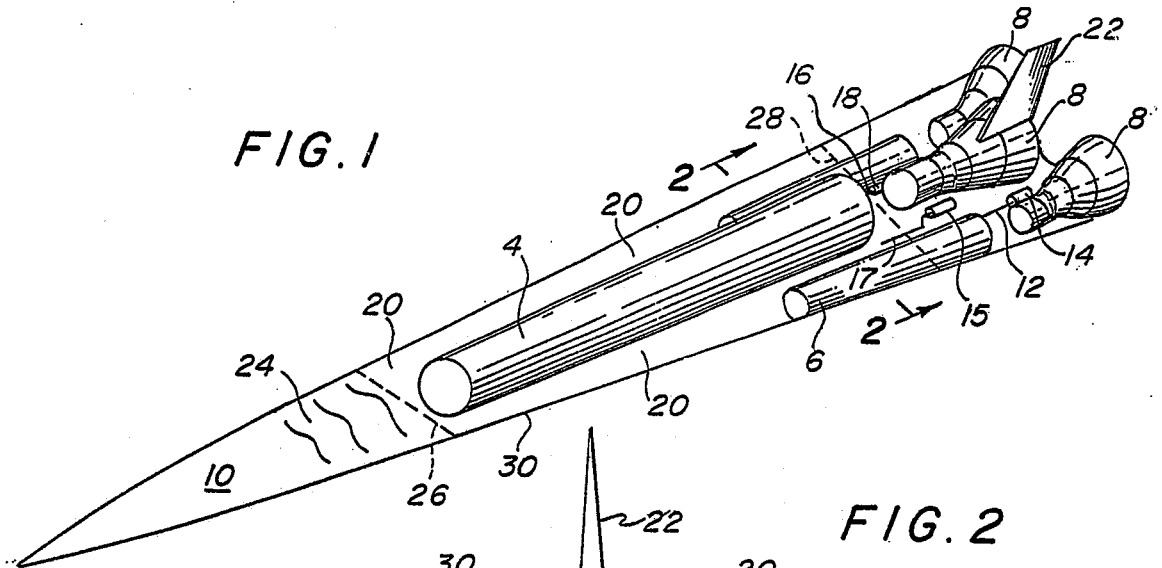
FIG. 1
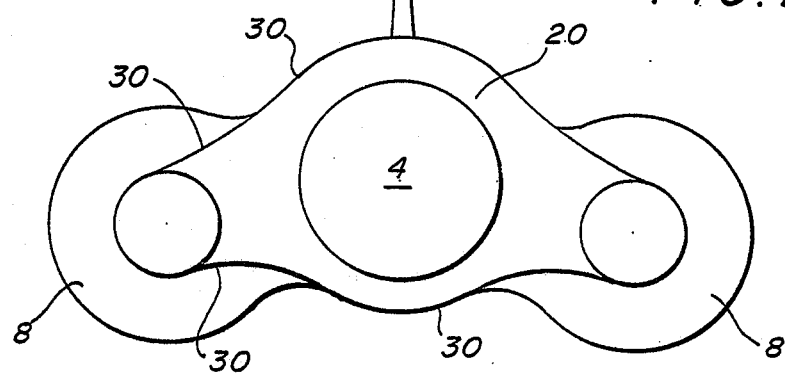
FIG. 2
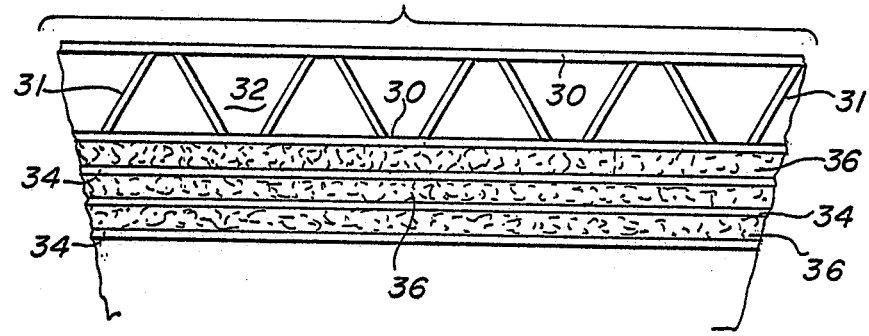
FIG. 3
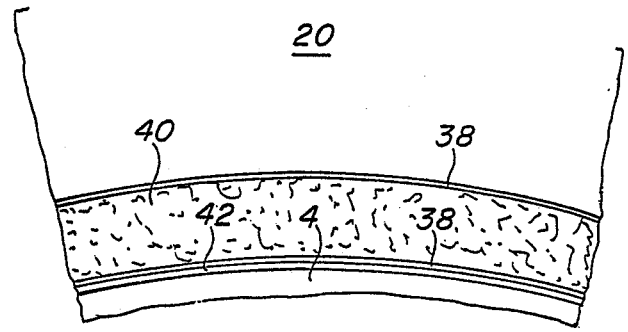

MULTIPLE-PROPELLANT AIR VEHICLE AND PROPULSION SYSTEM

CROSS REFERENCE TO RELATED APPLICATIONS

This patent application relates to U.S. patent application Ser. Nos. 918,213, 918,214 and 918,217 filed on Oct. 14, 1986 on behalf of George A. Coffinberry, and to U.S. patent application Ser. No. 918,212 filed Oct. 14, 1986 on behalf of Monica M. Lau and George A. Coffinberry, which patent applications are assigned to the instant assignee.

BACKGROUND OF THE INVENTION

This invention relates to a propulsion system and method for air vehicles, and more particularly, to a propulsion system and method for aircraft having rocket engines, scram jet engines or ram jet engines. Liquid hydrogen, liquid hydrocarbon and liquid oxygen are stored and used in a systematic way to achieve the necessary requirements of high propulsion thrust, low air vehicle weight and low air vehicle drag in a relatively simple air vehicle and propulsion system design.

Single-stage-to-orbit flight can be considered from the standpoint of high acceleration rates resulting from a combination of high net available thrust, low weight of the air vehicle and low aerodynamic drag. The weight of the propellants diminishes as flight progresses, and with positive net thrust available, the air vehicle will reach orbital insertion velocity at orbital altitudes as long as propellant reserves are available. Therefore, a key factor in propulsion of air vehicles is the amount of propellant relative to air vehicle size A second key factor in single-stage-to-orbit flight is low fixed weight of the air vehicle and the propulsion system since this weight must be countered by thrust during the entire ascent to orbit. A third factor in single-stage-to-orbit flight is the shape of the air vehicle which must yield a favorable relationship of lift and drag. The final key factor is high thrust from the propulsion system, namely, the rocket engines of the air vehicle. In view of the foregoing, it can be easily seen that it is desirable to increase the amount of propellant relative to the size of the air vehicle; to reduce the fixed weight of the air vehicle and propulsion system, thereby reducing the amount of thrust to propel the air vehicle and propulsion system to orbit; to improve the aerodynamic shape of the aircraft; and to improve the amount of thrust which can be achieved by the propulsion system.

A large number of liquid propulsion systems including multiple-propellant liquid propulsion systems, are currently known in the art. However, it is difficult to store the propellants in the air vehicle to achieve maximum utilization of storage space in the vehicle while reducing the weight of the storage tanks and providing an air vehicle having low aerodynamic drag. In order to achieve the foregoing for liquid propellant propulsion systems, it has generally been necessary to provide vacuum-type storage tanks in air vehicles to store liquid propellants. Vacuum-type storage vessels and systems are difficult to maintain and substantially increase the weight of the air vehicle. Accordingly, it is desirable to eliminate the requirement of vacuum-type storage tanks and other bulky systems for the storage of liquid propellants on board air vehicles Hydrocarbon-liquid oxygen mixtures have been widely used as propellants in propulsion systems of air vehicles It is known that such hydrocarbon fuels burn in combustion chambers at temperatures exceeding 5000° F. and generate a great amount of thrust However, propulsion systems for more recent air vehicle design require greater thrust than that which is generally achieved by the hydrocarbon-liquid oxygen mixtures, and generally, more complex propellants in more complex propulsions systems have been developed to provide higher thrust. Most of these complex propellants cannot be used in conventional propulsion systems for various reasons, such as extremely high combustion temperatures, and complex propulsion systems and storage systems must be developed to accommodate the burning of such propellants. The complex propulsion systems which overcome these difficulties contribute substantially to the weight of the air vehicle. In view of the foregoing, it can been seen that it would be advantageous to utilize the less complex propulsion systems based on hydrocarbon-liquid oxygen fuel mixtures to overcome the foregoing disadvantages.

It is well known that certain chemical substances such as high molecular weight hydrocarbons, react endothermically to produce reaction products which can be used as fuel. Prior art systems have been developed which convert certain chemical substances by endothermic reactions into fuels which can be burned in a combustor. However, many of the prior art systems are disadvantageous because the process of endothermic reaction produces certain reaction products which can build up an undesirable coating in the combustor. Accordingly, it is desirable to provide a propulsion system which utilizes the simple hydrocarbons, such as, ethylene, ethane, propylene and propane, as the chemical substance which endothermically reacts to produce predominantly only reaction products useful as improved fuels in propulsion systems of air vehicles.

In prior art propulsion systems which utilize fuels which produce high temperatures in the propulsion system, such as, in a combustion chamber, it has been difficult find materials which can withstand the high temperatures, that is, temperatures of 5000° F. and higher. Many types of combustor liners and throat liners of rocket casings have been proposed, however, they are complex and expensive or have limited lifetime or require excessive amounts of coolants circulated therethrough to prevent structural weakening and/or melting of the liner material. Accordingly, it is desirable to provide improved combustor and throat designs and materials in propulsion systems which overcome the foregoing disadvantages.

SUMMARY OF THE INVENTION

Accordingly, the primary object of the present invention is to provide an improved air vehicle and propulsion system of the type which utilizes multiple propellants.

Another object of the present invention is to provide a propulsion system and method which utilizes a selection of propellants in a systematic way to achieve single-stage-to-orbit flight while taking into consideration the requirements of both the air vehicle and propulsion system design.

It is another object of the present invention to provide a fuel storage system and method for storing multiple fuels in a light weight, simple vessel design and offering maximum propellant reserves in an air vehicle of minimum size and of minimum weight It is another object of the present invention to provide a fuel storage device and method which offers maximum propellant reserves while providing optimum air-vehicle shape in terms of lift and drag Still another object of the present invention is to provide a propulsion system and method utilizing combustor liners and nozzle throat liners for containment of high combustion pressures and which can withstand high combustion temperatures.

Another object of the present invention is to provide a propulsion system and method which utilizes a mixture of hydrocarbon and hydrogen fuel with liquid oxygen oxidizer for high combustion temperatures from low molecular weight fuels.

It is still another object of the present invention to provide a propulsion system and method for cooling of the liners of the combustor and nozzle throat of a rocket engine.

Another object of the present invention is to provide an improved propulsion system and method wherein the combustor liner and nozzle throat liner of a rocket engine are cooled by the endothermic decomposition of the fuel.

Still another object of the present invention is to provide an improved rocket combustor and nozzle throat design which increases heat transfer and increases residence time for endothermic cooling of the combustor liner and nozzle throat liner.

It is still another object of the present invention to provide an improved fuel injection system and liquid oxygen injection system for injecting fuel and liquid oxygen into the combustion chamber of a propulsion system.

These and other objects are achieved in accordance with the present invention by the selection of a specific class of propellants used in conjunction with an improved propulsion system and an improved air vehicle design.

The improved propulsion system of the present invention utilizes hydrocarbon fuel and comprises a rocket casing having a combustor liner and a throat liner; a fuel passageway for the hydrocarbon fuel adjacent to and surrounding the combustor liner and the throat liner; means for providing fuel flow in the fuel passageway; means for providing high heat flux to the combustor liner and throat liner from combustion within the rocket casing, whereby the temperature of the liners exceeds their thermal limits; and means for cooling the combustor liner and throat liner by endothermic pyrolysis of the hydrocarbon in the fuel passageway. In one aspect of the present invention, the endothermic pyrolysis of the hydrocarbon in the fuel passageway is carried out in the presence of hydrogen, and the hydrogen in the fuel accelerates the rate of endothermic pyrolysis. In another aspect of the present invention, the endothermic pyrolysis of the hydrocarbon is carried out in the fuel passageway in the presence of catalyst means which accelerates the rate of endothermic pyrolysis. The endothermic pyrolysis of the class of hydrocarbon fuels used in the present invention, in the presence of hydrogen and/or in the presence of catalyst, provides a fuel product having higher combustion rates, a fuel product having higher combustion temperatures and/or a fuel product having lower molecular weight The aircraft of the present invention has a propulsion system which utilizes a dual fuel system, wherein at least one of the fuels is a cryogenic fuel. A non-vacuum inner tank contains the cryogenic fuel, and a non-vacuum outer tank surrounding the inner tank contains a second fuel, the second fuel being a fuel having a low freezing point and a high boiling point which acts as an insulator for the cryogenic fuel in the inner tank The second fuel in the outer tank can also be a cryogenic fuel. The propellant tank or vessel system includes a pressurized, cylindrical inner tank or vessel for containing or storing the liquid cryogenic fuel, for example, hydrogen, and it has a rigid insulated wall Surrounding the inner tank for containing and storing the liquid cryogenic fuel, is an outer tank for containing the second fuel which is generally a liquid and/or gaseous hydrocarbon. By surrounding the inner tank containing for example, liquid hydrogen, with pre-cooled liquid and/or gaseous hydrocarbon, excessive boil-off of the liquid hydrogen is prevented at high altitudes. The layer of liquid and/or gaseous hydrocarbon insulates the liquid hydrogen, thus avoiding the need for conventional cryogenic vacuum vessels as insulation. The wall of the outer tank for containing the hydrocarbon is the skin of the air vehicle. Thus, the outer wall of the outer tank conforms to the aerodynamic shape of the air vehicle. The pre-cooled hydrocarbon is substantially unpressurized and therefore fills the entire space between the liquid hydrogen tank and the skin of the air vehicle. This design and method for storing the fuels in the air vehicle permits the air vehicle to be shaped for optimum lift and drag without reduction in fuel reserves Storage means for liquid oxidizer are provided, and conventional means are used to maintain the liquid oxidizer in a sub-cooled state to reduce boil-off. The liquid oxidizer storage means may be arranged by any suitable configuration to fill an unpressurized vessel or vessels which conform to the shape of the air vehicle and the improved fuel storage system of the present invention.

There is also provided in accordance with the present invention a propulsion system having a rocket casing containing a combustor, propellant injectors, nozzle throat and nozzle; a fuel passageway wherein fuel is endothermically pyrolized, the fuel passageway being adjacent to and surrounding the combustor and nozzle throat; and means for providing fuel flow in the fuel passageway, wherein the improvement comprises a woven silicon carbide fiber inner wall forming a combustor liner and a nozzle throat liner and a woven silicon carbide fiber outer wall spaced from the inner wall to form said fuel passageway. The silicon carbide fibers are woven, preferably continuously, and conduct heat from the combustor and nozzle throat to the fuel passageway, thereby providing heat for the endothermic pyrolysis of the fuel In preferred embodiments, the woven silicon carbide fiber inner wall has a porosity for selectively controlling the diffusion of hydrogen from the passageway through the wall into the combustor and nozzle throat. This improvement in the propulsion system, that is, in the rocket engines wherein the combustion chamber is made from continuous-wound silicon carbide fibers, permits rocket engines to be operated at very high temperatures from fuels of low molecular weight, that is, for example, from fuels such as low molecular weight hydrocarbons and hydrogen in the presence of the oxidizer, oxygen The combustion products of these fuels have a relatively low molecular weight. As used herein, low molecular weight hydrocarbons are unsaturated or saturated hydrocarbons having less than four carbon atoms.

Hydrogen available from the liquid hydrogen in the hydrocarbon mixture in addition to hydrogen resulting from the endothermic decomposition of the hydrocarbon in the fuel passageway, promotes the formation of a large fraction of relatively low molecular weight water vapor in the combustion products High combustion temperature in the combustor, and the high temperature in the nozzle throat, is accommodated by the combined use of the continuously-wound silicon carbide fibers and by film cooling from the hydrogen in the fuel passageway wherein the hydrogen diffuses from the fuel passageway through the combustor liner and throat liner into the combustor chamber and nozzle throat chamber, respectively. The net result is a combustion temperature and molecular weight ratio which yields a high sonic velocity in the nozzle throat of the rocket engine, and after supersonic expansion, a high rocket engine exhaust velocity.

In accordance with the present invention, the wound silicon carbide fiber construction of the combustor liner and throat liner provides high hoop strength, and the fiber layers provide transpiration cooling by means of the controlled porosity of the wound silicon carbide fibers which permits the migration or diffusion of hydrogen, but not hydrocarbon, under pressure through the walls into the combustor chamber and nozzle throat chamber. Thus, film cooling of the hot side of the wall is achieved while at the same time the addition of hydrogen decreases exhaust gas molecular weight yielding higher throat velocity. Additionally, the hydrogen film on the combustor and nozzle throat side of the combustor liner and nozzle throat liner reduces fluid wall friction in the nozzle throat.

In another aspect of the present invention, the propulsion system comprises a rocket casing having a combustor chamber with a combustor liner and a nozzle throat chamber with a nozzle throat liner; a fuel passageway adjacent to and surrounding the combustor liner and the nozzle throat liner which form the inner wall of the fuel passageway, the outer wall of the fuel passageway being spaced from the inner wall to form the passageway; means for providing fuel flow in the fuel passageway; and a plurality of flow directing vanes disposed in the fuel passageway to direct the fuel in the fuel passageway circumferentially. Thus, the fuel travels a longer path through the passageway which increases the residence time of the fuel in the passageway to promote heat transfer to the fluid in the fuel passageway. By the plurality of flow directing vanes, there is a longer fluid residence time in the fuel passageway, and this provides higher heat transfer and extended time for the endothermic pyrolysis or decomposition of the hydrocarbon fuel.

In a further improvement, a plurality of fuel injection holes in the combustion liner inject fuel into the combustion chamber in a direction which promotes circumferential motion of the fuel in the combustor chamber. An oxidizer is also introduced through oxidizer injection holes to the center of the combustion chamber to inject oxidizer into the combustion chamber in a direction which promotes circumferential motion of the oxidizer. In this manner, the fuel and the oxidizer are mixed in the chamber prior to and during combustion.

By the present invention, the hydrocarbon fuel is used to generate fuel products having at least one of the following properties: (1) higher combustion rates, (2) higher combustion temperatures and (3) lower molecular weight prior to combustion in the combustor chamber. For example, acetylene is a preferred fuel product which has a higher combustion rate, a higher combustion temperature and a lower molecular weight than the hydrocarbon from which it is generated. In one embodiment of the present invention, ethylene is thermally converted to acetylene and hydrogen using hydrogen in the fuel passageway as a catalyst and/or using additional catalyst, while excess hydrogen from the fuel mixture also acts to buffer and prevent carbon polymerization which results in coke or in certain cases, acetylene detonation.

By the present invention, it is possible to emphasize the consumption of liquid oxygen, liquid and/or gaseous hydrocarbon and liquid hydrogen in that order. This is important because at any rocket exhaust velocity, thrust is obtained by propellant mass addition in order to increase momentum. Liquid oxygen, followed by liquid hydrocarbon, has high liquid density, and therefore, high propellant fraction relative to air vehicle size and air vehicle fixed weight.

The propulsion systems and methods of the present invention may be used in any air vehicle, the engine or engines of which utilize a rocket casing, for example the propulsion systems and methods of the present invention can be part of a rocket engine, part of a ram jet engine or part of a scram jet engine.

BRIEF DESCRIPTION OF THE DRAWINGS

These and various other objects, features and advantages of the invention can be best understood from the following description taken in conjunction with the accompanying drawings in which;

FIG. 1 is a partially cut-away isometric illustration of a rocket-powered air vehicle which illustrates the propellant vessels of the present invention.

FIG. 2 is a cross-sectional view taken at lines 2—2 of FIG. 1 showing the propellant and oxidizer tanks of the air vehicle.

FIG. 3 is a cross-sectional view of a segment of the propellant tanks showing the construction of the walls of the tanks.

DETAILED DESCRIPTION OF THE INVENTION

Figure 4:
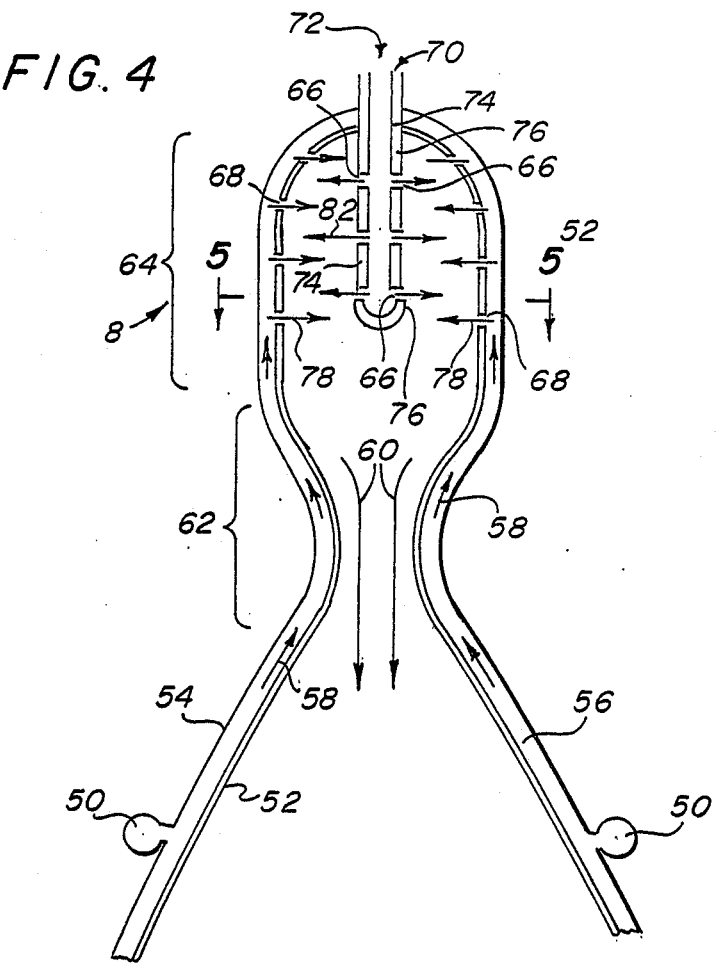
FIG. 4 is a cross-sectional view of the upper portion of a rocket engine and illustrates the fuel passageway, the throat nozzle liner, the combustor liner and the oxidizer injector in accordance with the present invention.

FIG. 1 shows a typical air vehicle 10 having a cockpit and/or payload 24 in the forward section of the air vehicle, three engines 8 and tail section 22 in the aft section of the air vehicle and the improved fuel storage system of the present invention comprising liquid hydrogen tank 4 surrounded by hydrocarbon tank 20 as well as liquid oxidizer tanks 6 located in the mid to aft section of the air vehicle. Any air vehicle design may be used with the improved propulsion systems and methods of the present invention.

Referring to FIGS. 1 and 2, liquid and/or slush, hydrogen is contained and pressurized in liquid hydrogen tank 4 of rocket powered air vehicle or aircraft 10.

Slush hydrogen is a combination of liquid and solid hydrogen. Hydrocarbon tank 20 surrounds liquid hydrogen tank 4. As used herein, liquid hydrogen tank 4 is a non-vacuum, inner tank for containing a cryogenic fuel, such as hydrogen, which normally requires a cryogenic vacuum insulation chamber or vessel, and hydrocarbon tank 20 is a non-vacuum, outer tank surrounding the inner tank for containing a second fuel, such as, a fuel having a low freezing point and a high boiling point which acts as an insulator for the cryogenic fuel in inner tank 4.

Exemplary of the fuels having a low freezing point are those which have a freezing point in the range of about 150° R to about 200° R and a high boiling point, such as, from about 275° R to about 425° R. Hydrocarbon fuels, whether liquid or gaseous ullage, and falling within the foregoing freezing point and boiling point range, provide the necessary thermal barrier needed to prevent hydrogen boil-off The insulation in the wall which separates liquid hydrogen tank 4 and hydrocarbon tank 20, is sufficient to preclude freezing of the hydrocarbon by the liquid hydrogen during the period of time normally required for flight operations. At 20 p.s.i.a. tank pressure, liquid hydrogen at a temperature of 36° R absorbs 5 BTU per pound, and slush hydrogen at a temperature of 25° R absorbs 25 BTU per pound before boiling occurs. In addition to low freezing point, the hydrocarbon must have a high boiling point (low vapor pressure) so that it does not require pressurization at high altitudes. In accordance with the present invention, pressurization of less than about 2 p.s.i.a. (greater than ambient pressure) is acceptable. The low vapor pressure of the hydrocarbon fuel permits hydrocarbon tank 20 to be shaped as desired. Accordingly, hydrocarbon tank 20 can be shaped to provide air vehicle 10 with reduced aerodynamic drag and reduced atmospheric frictional heating.

Hydrocarbon fuels which may be used in accordance with the foregoing parameters to provide the necessary insulation for the liquid hydrogen, include ethylene, ethane, propylene, propane and mixtures thereof. Since these fuels are also cryogenic fuels, the fuel in outer tank 20 can also be a cryogenic fuel. The following table shows examples of typical hydrocarbon fuels which may be used in hydrocarbon carbon tank 20 in accordance with the present invention.

TABLE

| HYDROCARBON FUELS | | | |
|---|---|---|---|
| | Boiling Point (°R) | Freezing Point (°R) | Liquid Density at 240° R (LBS/FT³) |
| Ethylene C₂H₄ | 305 | 188 | 38 |
| Ethane C₂H₆ | 333 | 182 | 38 |
| Propylene C₃H₆ | 406 | 159 | 40 |
| Propane C₃H₈ | 416 | 150 | 39 |

The fuels shown in the above table can be sub-cooled as desired in order to reduce their vapor pressure and avoid high altitude boiling. For example, the fuels in the above table can be sub-cooled to 240° R. The liquid density at 240° R is shown for each of the hydrocarbon fuels in the table.

Inner tank 4 for containing liquid hydrogen, is generally cylindrical as shown in FIGS. 1 and 2. In preferred embodiments, tank 4 is an elongated cylindrical tank extending substantially from the cockpit and load section 24 of aircraft 10 the entire length of the vehicle to the rocket section of the aircraft. For example, tank 4 is generally located centrally in the aircraft as shown in FIG. 2 and extends from approximately line 26 to line 28 in aircraft 10 as shown in FIG. 1. Liquid hydrogen fuel line 16 is connected to a conventional liquid hydrogen pump 18 to provide liquid hydrogen to the appropriate conduits and manifolds for distribution to the fuel conduits and passageways in the propulsion systems of the present invention. Although only one liquid hydrogen fuel line and one liquid hydrogen pump are shown in FIG. 1, it is within the purview of those skilled in the art to provide any plurality of fuel lines and pumps, as well as auxiliary equipment and controls to distribute the liquid hydrogen.

Liquid hydrogen tank 4 can be constructed of any insulating materials, a reasonable thickness of which will preclude the liquid hydrogen from freezing the hydrocarbon in tank 20 over a period of time sufficient for flight operations. As shown in FIG. 3, typical light weight wall construction of liquid hydrogen tank 4 comprises graphite-epoxy resin walls 38 preferably fiber reinforced with, for example, graphite fibers, separated by an insulating material 40. For example, the insulating material can be about 1 inch of liquid polyurethane foam injected into and cured between graphite epoxy resin walls 38 to form polyurethane insulation 40. Other typical insulating materials which can withstand the low temperatures include, for example, compacted silica. Insulating material 40 prevents the freezing of the liquid hydrocarbon in tank 20 by the liquid hydrogen in tank 4. The inner surface of liquid hydrogen tank 4 is preferably sheeted or coated with a material which prevents the diffusion of hydrogen through the walls 38. For example, a metal foil comprising an iron-nickel alloy containing about 40% to about 50% nickel and having a low coefficient of thermal expansion is suitable for the coating 42 on inner wall 38 of tank 4. One commercially-available foil which may be used for this purpose is known as Invar ®.

In accordance with the present invention, the outer wall of the outer tank, that is, the outer wall of outer tank 20 is the skin 30 of aircraft 10. Thus, the outer wall of outer tank 20 conforms to the aerodynamic shape of aircraft 10. Skin 30 of aircraft 10 which represents the outer wall of hydrocarbon tank 20, is preferably about 1 inch thick and is in the form of an isogrid. Typical skin materials are well-known in the art. For example, high temperature (about 1600° F.) materials such as titanium aluminide or certain nickel-based super alloys, such as, Rene 41, may be used as the skin of the aircraft. Outer skin 30 is bonded to a high temperature insulating material 36, such as commercially available Min-K ® thermal insulation reinforced with fibrous media and very fine, heat-resistant particulate matter and having a micro-porous structure with very low thermal conductivity and low thermal diffusivity. Alternatively, compacted silica for example, compacted silica containing fibrous media and very fine, heat resistant particulate matter, having a microporous structure with low thermal conductivity and low thermal diffusivity, may also be used as the high temperature insulation material 36. The inner surface of the outer wall of tank 20 is also covered with an appropriate material to reduce radiation. For example, an iron-nickel alloy containing about 40% to about 50% nickel in the form of a foil can be used as the radiation barrier 34 and coating 34 on the wall of hydrocarbon tank 20. Foil 34 laminated with high temperature insulation 36 also reduces radiation. Metal foil 34 is also used to reduce thermal expansion gradients in the tank.

In order to avoid freezing of moisture on outer skin 30 of aircraft 10, purge gas is used in the spaces 32 of isogrid structure 31. For example, warm gaseous nitrogen can be routed as purge gas through spaces 32 of isogrid 31 to warm outer skin 30.

In accordance with the present invention, there is provided a method of storing fuels in an aircraft having a propulsion system which utilizes a dual fuel system wherein one of the fuels is a cryogenic fuel which normally requires a cryogenic vacuum insulation comprising placing the cryogenic fuel which normally requires a cryogenic vacuum vessel, in an inner, non-vacuum tank and placing a second fuel having a low freezing point and a high boiling point in the area surrounding the inner tank, whereby the second fuel is an insulator for the cryogenic fuel in the inner tank.

Referring to FIG. 1, hydrocarbon fuel line 17 is connected to hydrocarbon fuel pump 15 for supplying hydrocarbon fuel to the appropriate conduits and manifolds in accordance with the present invention. Liquid oxygen fuel line 12 supplies liquid oxygen to the appropriate conduits and manifolds by means of liquid oxygen fuel pump 14. Any conventional fuel supply systems including fuel lines, fuel pumps and fuel manifolds and pluralities thereof, as well as controls and auxiliary equipment (not shown) may be used to supply fuels and oxidizer to the propulsion systems of the present invention.

Referring to FIG. 4, the cross-sectional view of a typical rocket casing 8 constructed to utilize the specific class of fuels in accordance with the present invention, is shown. Rocket casing 8 may be used as part of a rocket engine, part of a ram jet engine or part of a scram jet engine. A mixture of hydrogen and hydrocarbon supplied from tanks 4 and 20, respectively, of FIG. 1, through their respective fuel lines and fuel pumps is routed to manifold 50. Manifold 50 is preferably circumferentially disposed around the nozzle of rocket engine 8 and communicates to fuel cavity or passageway 56 between fuel wall 54 and wall 52. Walls 54 and 52 form nozzle throat 62 and combustor chamber 64 of rocket casing 8. Fuel passageway 56 which is supplied by fuel from manifold 50, and in which the fuel flows in the direction of arrows 58, is adjacent to and surrounds the combustor section or chamber shown generally as the area 64 in FIG. 4 and the nozzle throat shown generally as the area 62 in FIG. 4. In preferred embodiments, fuel passageway 56 surrounds the entire rocket casing so that fuel is supplied to the combustor chamber from the entire periphery of the rocket casing. The fuel passageway can be any dimension sufficient to permit an adequate supply of fuel to the combustor chamber and can easily be determined by one skilled in the art.

In accordance with the present invention, fuel wall or outer wall 54 and inner wall 52, also defined as nozzle wall liner 52, nozzle throat liner 52 and combustor liner 52, depending upon its location in rocket casing 8, is made of woven silicon carbide fiber. The silicon carbide fibers or filaments are woven and in the case of inner wall 52 conduct heat from the combustor 64 and nozzle throat 62 to fuel passageway 56, and thereby provide heat for the endothermic pyrolysis of the fuel in fuel passageway 56. The high temperature silicon carbide fibers are well-known in the art and are wound principally in a circumferential direction to provide high pressure containment for the rocket engine. The silicon carbide fibers can function up to about 2200° F. without cooling.

In preferred embodiments of the present invention, inner wall 52, that is, the nozzle throat liner and the combustor liner, are made of a woven silicon carbide fiber having a porosity for selectively controlling the diffusion of hydrogen from passageway 56 through wall 52 into the combustor chamber 64 and nozzle throat 62. Outer wall 54 of fuel passageway 56 is made of a high temperature woven silicon carbide fiber and is non-porous so that the hydrogen will not diffuse through wall 54. Wall 52 is porous so that hydrogen in fuel passageway 56 at a higher pressure, for example, about 4000 p.s.i.a., can pass through or diffuse through wall 52 to the nozzle throat and combustor chamber having a pressure less than the pressure of the fuel in fuel passageway 56, for example, about 3000 p.s.i.a. This diffusion of hydrogen through wall 52 into the internal chambers of the rocket casing 8 provides film cooing as shown by arrow 90 and layer 92 in FIG. 6.

Figure 6:
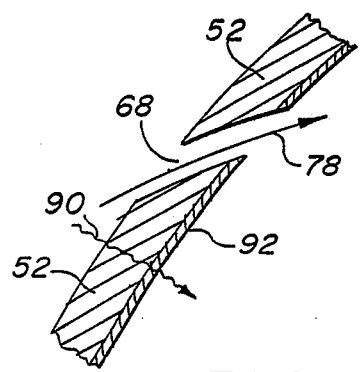
FIG. 6 illustrates a cross-sectional view of the combustor liner of the present invention.

As seen in FIG. 6, which shows a magnified portion of combustor liner 52, hydrogen gas 90 passes through or diffuses through combustor liner or nozzle throat liner 52 into the combustor chamber or nozzle throat chamber by diffusing through the porous, continuously-wound silicon carbide fiber wall 52 to form a film 92 of hydrogen on the side of the wall facing the combustor chamber and nozzle throat. The diffusion of hydrogen through wall 52 provides the transpiration cooling by the migration of the hydrogen under pressure through the wall as discussed above, and is possible because of the porosity of the wall. It is this effect which contributes to maintaining the temperature of combustion liner and nozzle throat liner 52 at a temperature of less than the decomposition temperature of the silicon carbide filaments, for example, maintaining the temperature of wall 52 at less than about 1800° F. to about 2200° F.

In making the combustor liner and nozzle throat liner for a rocket casing containing a combustor, propellant injectors, nozzle throat and nozzle; a fuel passageway wherein fuel is endothermically pyrolized, the fuel passageway being adjacent to and surrounding the combustor and nozzle throat; and having means for providing fuel flow in the fuel passageway, silicon carbide fibers are woven in a plurality of layers in a pattern which promotes high pressure containment for the combustor and nozzle throat; and the woven silicon carbide fibers are formed in the shape of a combustor and nozzle throat. Thus, walls 52 and 54 are constructed by integrating filaments or fibers of silicon carbide, preferably in layers which are circumferentially wound in a continuous woven pattern. The filaments or fibers of silicon carbide not only promote high pressure containment for the combustor and nozzle throat, but also are effective in conducting heat away from the combustor chamber area 64 and nozzle throat area 62 of rocket casing 8. In winding the filaments or fibers of silicon carbide, conventional techniques such as winding the fibers around a solid core can be easily carried out by one skilled in the art, and the pattern of the weave can be selected in order to provide the porosity required for wall 52 and the non-porosity required for wall 54. The wound and shaped silicon carbide fibers can be easily assembled to form fuel passageway 56 having optimum dimensions by conventional techniques well-known in the art.

In order to obtain the desired porosity for selectively controlling the diffusion of hydrogen through the woven silicon carbide of wall 52, various techniques well-known in the art can be utilized, for example, chemical vapor deposition and/or chemical vapor infiltration can be used to deposit or infiltrate the wound or woven silicon carbide fibers with organometallic compounds which selectively permit the diffusion of hydrogen through the woven silicon carbide.

Figure 5:
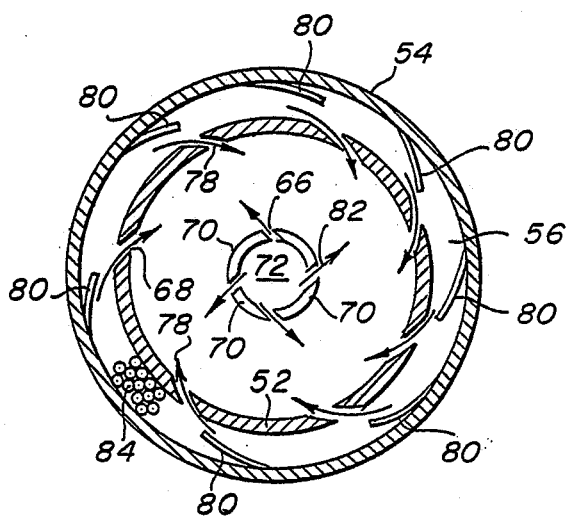
FIG. 5 is a cross-sectional view of the rocket engine taken along lines 5—5 of FIG. 4 and further illustrates the fuel flow in the fuel passageway and the flow controlling vanes of the present invention.

Referring to FIGS. 4 and 5, in another aspect of the present invention, a series of flow directing vanes 80 are located in fuel passageway 56 to direct the fuel flowing in fuel passageway 56 in the direction of arrows 58 circumferentially whereby the fuel travels a longer path through the passageway 56 and thereby increases the residence time of the fuel in the passageway to promote heat transfer to the fluid and/or gas and to extend the time of reaction for the endothermic pyrolysis of the fuel. Swirl vanes 80 spin the gaseous fuel, for example, hydrogen and hydrocarbon, in order to promote heat transfer. Swirl vanes 80 may be constructed as an integral part of outer wall 54, or they may be individually mounted on outer wall 54. The swirl vanes may be of any suitable material which can withstand the temperatures and pressures in fuel passageway 56, and are preferably made from plies or laminates of the woven, high temperature silicon carbide filaments or fibers. The flow directing vanes 80 are arranged so that they spin the fuel as it moves from the direction of manifold 50 toward the combustor section 64 of the rocket casing 8. The flow directing vanes may be disposed in the entire fuel passageway or in any segments thereof. However, in the most preferred embodiments of the present invention, flow directing vanes 80 are located at least in the fuel passageway 56 in the area of combustor chamber 64.

Fuel injector ports 68, preferably in the form of circular holes in wall 52 in the area of combustor chamber 64 are arranged in the wall 52 in such a manner that they continue or promote the swirling motion of the hot gaseous fuel represented by arrows 78, as it passes from fuel passageway 56 into the combustion chamber. Any desired number of fuel injector ports 68 may be used in accordance with the present invention. In most embodiments, injection velocity of the hot gaseous fuel into the combustion chamber is in excess of about 1000 feet per second at about 1000 p.s.i. pressure drop. A plurality of fuel injection holes 68 are provided in combustor liner 52 to inject fuel into the combustion chamber in a direction which promotes circumferential motion of the fuel. In preferred embodiments, wherein the combustor liner is substantially circular in cross-section, the fuel injector holes in the combustor liner are oriented in the combustor liner at an angle less than 90° from the perpendicular line drawn to the tangent of the combustor liner. In most embodiments, this angle is about 30° to about 60°, however, any angle of less than 90° which is sufficient to promote the circumferential motion of the fuel as it enters from the fuel passageway into the combustion chamber, may be used.

The propulsion system of the present invention also provides means for introducing oxidizer, such as liquid oxygen, from oxidizer line 72 which is provided with oxidizer from oxidizer tanks 6 as shown in FIGS. 1 and 2. The oxidizer is introduced into the combustion chamber through oxidizer injection ports 66 as shown in FIGS. 4 and 5. The oxidizer line 72 is centrally located in the combustion chamber and provides a plurality of oxidizer injection holes or ports 66 to introduce oxidizer to the center of the combustion chamber. The oxidizer is preferably injected into the combustion chamber in a direction which promotes circumferential motion of the oxidizer as it enters the combustion chamber from the oxidizer line 72 so that the fuel and oxidizer are mixed in the chamber prior to and during combustion. In preferred embodiments, the means for introducing oxidizer into the combustion chamber is substantially circular in cross-section, and the oxidizer injection holes or ports 66 are oriented at an angle less than 90° from the perpendicular line drawn to the tangent of the means for introducing the oxidizer into the chamber. In preferred embodiments, the angle of the oxidizer injection ports is about 30° to about 60°, however, any angle which is sufficient to promote the circumferential motion of the oxidizer as it enters the combustion chamber, may be utilized.

In certain preferred embodiments of the present invention, the propulsion system embraces an alignment of fuel injection ports 66 and oxidizer injection ports 68 to promote overlapping of fuel and oxidizer as it enters the chamber, that is, the fuel injection ports and oxidizer injection ports are staggered to promote overlapping of fuel and oxidizer in the combustor chamber and further promote mixing of the oxidizer and fuel prior to and during combustion. In this manner fuel injected through injection ports 68 and oxidizer injected through injection ports 66 are layered, so that penetration occurs between the propellants and oxidizer prior to and during combustion. In this manner, a high state of mixing and rapid combustion are achieved when the fuel mixture is ignited.

Oxidizer injection liner 72 includes a porous sleeve preferably made of woven silicon carbide fibers. Hydrogen 70 is introduced through hydrogen injector line 74. The porous hydrogen injector line 74 also provides the transpirational cooling of the injector line 74 as discussed above for the combustion liner 52 and nozzle throat 52. The hydrogen 70 introduced through hydrogen injection ports 76 also mixes with oxidizer to initiate combustion and cool the oxygen injector line.

In certain embodiments of the present invention, the circumferential motion of the fuel from the fuel injection holes in the combustion liner is substantially clockwise in motion, and the circumferential motion of the oxidizer through the oxidizer injection holes into the combustion chamber is in a substantially counterclockwise direction. In other embodiments, the circumferential motion of the fuel through the fuel injection holes in the combustion liner is substantially counterclockwise in direction, and the circumferential motion of the oxidizer through the oxidizer injection holes in the means for introducing oxidizer is substantially clockwise in direction.

In accordance with the present invention, there is also provided a propulsion system which utilizes a hydrocarbon fuel wherein means are provided for high heat flux to the combustor liner and throat liner, the heat being provided from combustion within the rocket casing or combustor chamber and nozzle throat, whereby the temperature of the liners exceeds their thermal limits from the combustion within the rocket casing and means for cooling the combustor liner and nozzle throat liner by endothermic pyrolysis of the hydrocarbon in the fuel passageway. Thus, in addition to convective and film cooling by the fuel as discussed above, hydrocarbon is decomposed, cracked and/or dehydrogenated by endothermic pyrolysis in fuel passageway 56 prior to combustion. Using ethylene ($C_2H_4$) as an example, the following reaction occurs in the fuel passageway in the presence of heat and in the absence of catalyst:

$$2C_2H_4 \xrightarrow{HEAT} C_4H_8$$

$$C_4H_8 \xrightarrow{HEAT} H_2 + C_4H_6$$

$$H_2 + C_4H_6 \xrightarrow{HEAT} 2H_2 + 2C_2H_2$$

The above endothermic reaction yields two pounds of hydrogen gas and 26 pounds of acetylene ($C_2H_2$) gas from 28 pounds of ethylene ($C_2H_4$). The heat absorbed during the reaction is 2413 BTU per pound of ethylene. Because of its extremely high combustion temperature, acetylene is inferior only to hydrogen in terms of maximum rocket thrust and specific impulse. Thus, in accordance with the present invention, acetylene is the most preferred product resulting from the endothermic pyrolysis of the hydrocarbons.

As seen above, when the hydrocarbon fuel is ethylene, the products of endothermic pyrolysis include acetylene and hydrogen. When the hydrocarbon fuel is ethane, the products of endothermic pyrolysis include methane, acetylene and hydrogen as well as trace amounts of various other hydrocarbons. When the hydrocarbon is propylene, the products of endothermic pyrolysis include methane, ethane, ethylene, acetylene and hydrogen and trace amounts of other hydrocarbon products. When the hydrocarbon fuel is propane, the products of endothermic pyrolysis include methane, ethane, ethylene, acetylene, propylene and hydrogen and trace amounts of various other hydrocarbon products. Naturally, it is within the scope of the present invention to utilize various mixtures of the foregoing hydrocarbons. In any event, the hydrocarbon fuels which are used in accordance with the present invention, are those the endothermic pyrolysis of which provides a fuel product having higher combustion rates, a fuel product having higher combustion temperatures and/or a fuel product having lower molecular weight than the hydrocarbon fuel from which it is derived. As indicated above, the fuel products are formed in fuel passageway 56 in the presence of heat generated within the combustion chamber and throat nozzle and which is conducted through wall 52.

Catalyst can be utilized in conjunction with the hydrocarbon fuel to accelerate compositional change of the hydrocarbon fuel, thus providing additional endothermic cooling of wall 52, and in certain cases, such as in the case of acetylene, a superior rocket fuel product results from the endothermic pyrolysis. For example, the catalyst means for the endothermic pyrolysis can be a catalyst bed 84 in fuel passageway 56 as shown in FIG. 5 where catalyst 84 is shown in the form of beads located in the passageway. The catalyst can also be coated on a wall in fuel passageway 56, such as wall 54 and/or wall 52. Catalyst can also be incorporated in the hydrocarbon fuel so that as the fuel is propelled through fuel passageway 56, the catalyst in the fuel accelerates the endothermic pyrolysis of the hydrocarbon fuel. Any typical catalyst well-known in the art of endothermic pyrolysis and cracking can be utilized in the present invention, including such catalysts as platinum and palladium.

In the foregoing process, energy is removed from the combustor and nozzle throat through wall 52 to the fuel in fuel passageway 56, then back to the combustion chamber by means of fuel injector ports 68. There is no net loss or gain of heat energy, however, wall 52 is cooled by the endothermic reaction, and more favorable combustion temperatures and combustion products are obtained, thereby yielding higher rocket nozzle velocity and higher thrust.

Accordingly, the present invention provides a method of improving the fuel system of a propulsion system having a rocket casing with a combustion chamber having a combustor liner and an exhaust gas throat having a throat liner with a fuel passageway adjacent to and surrounding the combustor liner and the throat liner wherein hydrocarbon fuel is passed through the fuel passageway; heat from the combustion of fuel in the combustion chamber is provided to the fuel passageway by radiation through the combustor liner and the throat liner; and the hydrocarbon fuel is heated at a temperature sufficient to cause the endothermic pyrolysis of the hydrocarbon in the fuel passageway, whereby the heat removed from the combustion chamber through the combustor liner and throat liner reduces the temperature in the combustion chamber at the combustor liner and the throat liner so the thermal limits of the combustor liner and throat liner are not exceeded.

In addition to propellant flow rate which determines combustion pressure (rocket throat choked at sonic velocity) and mixture ratio which determines combustion temperature, the ratio of hydrogen to hydrocarbon fuel can be varied to control structural temperature (in addition to rocket thrust). Excess hydrogen increases film cooling, reduces combustion temperature (fuel rich), reduces radiation from carbon compounds (hydrocarbon fuel) and promotes formation of relatively low molecular weight water. The ratio of hydrogen to hydrocarbon can be adjusted by one skilled in the art to achieve the most desirable combination of the foregoing variables, however, in most instances, a mass ratio of 50 weight percent hydrogen to 50 weight percent hydrocarbon is generally found to be desirable.

The present invention provides a systematic use of hydrocarbon and hydrogen fuels, and as such, there is no restriction as to the means by which the hydrocarbon is decomposed or converted to another form of hydrocarbon. For example, the conversion of ethylene or ethane to acetylene is well-known in the art. However, such conversion typically involves difficulty with respect to achieving maximum conversion yield (about 70% yield by weight acetylene from ethylene) within a short time (less than 5 milliseconds) at elevated temperatures. Furthermore, the conversion process, whether pyrolytic and/or catalytic can form undesirable carbon products, such as carbon-carbon molecules (coke) or metal carbides (from the catalyst). A particularly undesirable reaction is acetylene detonation as the result of carbon-carbon polymerization.

In one aspect of the present invention, the hydrocarbons are converted to more favorable products, that is, fuel products having higher combustion rates, higher combustion temperatures and/or lower molecular weights, by thermal conversion at about 1700° F. to about 2200° F. using the already available hydrogen fuel in the fuel mixture as supplied from manifold 50, to accelerate a molecular reaction wherein a single hydrogen molecule dissociates from the hydrocarbon and combines with two hydrogen atoms from the hydrocarbon to form a more desirable product, such as acetylene. For example, at about 1700° F., ethylene in the presence of hydrogen forms acetylene. The activation energy is reduced, and the conversion rate is accelerated. In addition, the excess hydrogen buffers the formation of carbon-carbon molecules including carbon polymerization because hydrogen molecules fit within the mean free path of free carbon atoms, therefore blocking one carbon atom from another carbon atom. Naturally, additional catalyst means can also be utilized with the means for cooling of the combustor liner and throat liner by endothermic pyrolysis of the hydrocarbon in the presence of hydrogen in the fuel passageway, whereby the hydrogen in the fuel accelerates the rate of endothermic pyrolysis. When the hydrocarbon fuel is a hydrocarbon, the endothermic pyrolysis of which results in the formation of coke and carbon polymers, the hydrogen in the fuel also inhibits the formation of coke and the polymerization of carbon, thereby preventing detonation in the fuel passageway. Conventional catalyst means as discussed above, can also be utilized in this propulsion system. Although it is not intended to limit the endothermic pyrolysis to any particular temperature, generally in accordance with the present invention, the hydrocarbon fuel and the hydrogen in the fuel passageway is heated at a temperature of about 1700° F. to about 2000° F. Although the hydrocarbon in the storage tank is a gas or a liquid or mixture thereof, and although the hydrogen in the storage tank is a liquid or slush, the hydrocarbon and hydrogen in fuel passageway 56 are generally in gaseous state due to the high temperature in the passageway.

Although it is not shown, means can easily be provided by one skilled in the art to ignite the fuel in the presence of oxidizer in the combustion chamber. For example, the igniter means can be an electrical system providing an electrical arc in the area of the fuel injection system, for example, hydrogen ports 76, fuel injector ports 68 and oxidizer injection ports 66.

The foregoing features taken alone or in combination with each other, provide improved propulsion systems and methods which utilize hydrocarbon fuels or hydrocarbon fuels in combination with hydrogen fuel in the presence of oxidizer. The foregoing systems also provide improved air vehicles having propulsion systems which utilize a dual fuel system and a method of storing fuels in an aircraft having a propulsion system which utilizes a dual fuel system.

While other modifications of the invention and variations thereof which may be employed within the scope of the invention have not been described, the invention is intended to include such modifications as may be embraced within the following claims.

What is claimed is:

1. A propulsion system which utilizes hydrocarbon and hydrogen fuel, comprising:
   (a) a rocket casing having a combustor liner and a throat liner;
   (b) a fuel passageway for the hydrocarbon and hydrogen fuel adjacent to and surrounding the combustor liner and the throat liner;
   (c) means for providing fuel flow in the fuel passageway;
   (d) means for providing high heat flux to the combustor liner and throat liner from combustion within the rocket casing whereby the temperature of the liners would exceed their thermal limits if not cooled; and
   (e) means for cooling of the combustor liner and throat liner by endothermic pyrolysis of the hydrocarbon in the presence of hydrogen in the fuel passageway, whereby the hydrogen in the fuel accelerates the rate of endothermic pyrolysis.

2. The propulsion system of claim 1 wherein the hydrocarbon fuel is a hydrocarbon, the endothermic pyrolysis of which results in the formation of coke and carbon polymers, and the hydrogen in the fuel inhibits the formation of coke and the polymerization of carbon, thereby preventing detonation in the fuel passageway.

3. The propulsion system of claim 1 further comprising catalyst means for the endothermic pyrolysis.

4. The propulsion system of claim 3 wherein the catalyst means is a catalyst bed in the fuel passageway.

5. The propulsion system of claim 3 wherein the catalyst is a catalyst coated on a wall in the fuel passageway.

6. The propulsion system of claim 3 wherein the catalyst is a catalyst in the hydrocarbon fuel.

7. The propulsion system of claims 1, 2, 3, 4, 5 or 6 wherein the hydrocarbon fuel comprises a hydrocarbon, the endothermic pyrolysis of which, in the presence of hydrogen, provides an improved fuel product with at least one of the properties selected from the group consisting of a fuel product having higher combustion rates, a fuel product having higher combustion temperatures and a fuel product yielding lower molecular weight.

8. The propulsion system of claims 1, 2, 3, 4, 5 or 6 wherein the hydrocarbon is ethylene, and the products of endothermic pyrolysis comprise acetylene and hydrogen.

9. The propulsion system of claims 1, 2, 3, 4, 5 or 6 wherein the hydrocarbon is ethane, and the products of endothermic pyrolysis comprise methane, acetylene and hydrogen.

10. The propulsion system of claims 1, 2, 3, 4, 5 or 6 wherein the hydrocarbon is propylene, and the products of endothermic pyrolysis comprise methane, ethane, ethylene, acetylene and hydrogen.

11. The propulsion system of claims 1, 2, 3, 4, 5 or 6 wherein the hydrocarbon is propane, and the products of endothermic pyrolysis comprise methane, ethane, ethylene, acetylene, propylene and hydrogen.

12. A method of improving the fuel system of a propulsion system having a rocket casing with a combustion chamber having a combustor liner and an exhaust gas throat having a throat liner and having a fuel passageway adjacent to and surrounding the combustor liner and the throat liner, comprising:
   (a) passing a hydrocarbon fuel and hydrogen through the fuel passageway;
   (b) providing heat from the combustion of fuel and hydrogen in the combustion chamber to the fuel passageway by radiation through the combustor liner and the throat liner;
   (c) heating the hydrocarbon fuel in the presence of hydrogen at a temperature sufficient to cause the endothermic pyrolysis of the hydrocarbon in the fuel passageway, whereby the heat removed from the combustion chamber through the combustor liner and throat liner reduces the temperature in the combustion chamber at the combustor liner and the throat liner so the thermal limits of the combustor liner and throat liner are not exceeded, and whereby the hydrogen in the fuel accelerates the rate of pyrolysis of the hydrocarbon.

13. The method of claim 12 further comprising heating the hydrocarbon fuel and hydrogen in the presence of a catalyst at a temperature sufficient to cause the endothermic pyrolysis of the hydrocarbon in the fuel passageway.

14. The method of claim 12 wherein the catalyst is a catalyst bed in the fuel passageway.

15. The method of claim 12 wherein the catalyst is coated on a wall in the fuel passageway.

16. The method of claim 12 wherein the catalyst is incorporated in the fuel.

17. The method of claims 12, 13, 14, 15 or 16 wherein the hydrocarbon fuel is a hydrocarbon, the endothermic pyrolysis of which results in the formation of coke and carbon polymers, and the hydrogen in the fuel reduces the formation of coke and carbon polymers, thereby preventing detonation of the coke and carbon polymers in the fuel passageway.

18. The method of claims 12, 13, 14, 15 or 16 wherein the hydrocarbon fuel comprises a hydrocarbon, the endothermic pyrolysis of which provides an improved fuel product with at least one of the properties selected from the group consisting of a fuel product having higher combustion rates, a fuel product having higher combustion temperatures and a fuel product yielding a lower molecular weight than the hydrocarbon fuel.

19. The method of claims 12, 13, 14, 15 or 16 wherein the hydrocarbon is ethylene, and the products of endothermic pyrolysis comprise acetylene and hydrogen.

20. The method of claims 12, 13, 14, 15 or 16 wherein the hydrocarbon is ethane, and the products of endothermic pyrolysis comprise methane, acetylene and hydrogen.

21. The method of claims 12, 13, 14, 15 or 16 wherein the hydrocarbon is propylene, and the products of endothermic pyrolysis comprise methane, ethane, ethylene, acetylene and hydrogen.

22. The method of claims 12, 13, 14, 15 or 16 wherein the hydrocarbon is propane, and the products of endothermic pyrolysis comprise methane, ethane, ethylene, acetylene, propylene and hydrogen.

23. The method of claims 12, 13, 14, 15 or 16 wherein the hydrocarbon fuel is heated at a temperature of about 1700° F. to about 2000° F.

* * * * *